Sept. 8, 1931.   J. H. JARNIER   1,822,350
ARRANGEMENT OF PERFORATIONS IN CINEMATOGRAPHIC FILMS
Filed Sept. 22, 1925   2 Sheets-Sheet 1
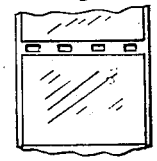
Fig.1.
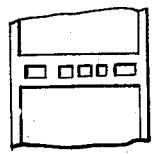
Fig.3.
Fig.2.
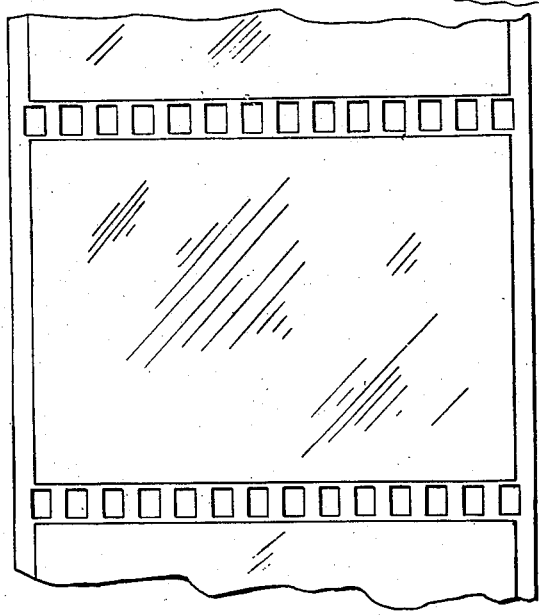
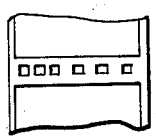
Fig.5.
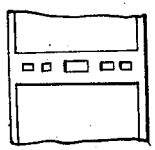
Fig.4.
Inventor:
Julien Henri Jarnier Sept. 8, 1931.  J. H. JARNIER  1,822,350
ARRANGEMENT OF PERFORATIONS IN CINEMATOGRAPHIC FILMS
Filed Sept. 22, 1925   2 Sheets-Sheet 2

Inventor
Julien Henri Jarnier
By
Atty.

Patented Sept. 8, 1931

1,822,350

UNITED STATES PATENT OFFICE

JULIEN HENRI JARNIER, OF PARIS, FRANCE

ARRANGEMENT OF PERFORATIONS IN CINEMATOGRAPHIC FILMS

Application filed September 22, 1925, Serial No. 57,864, and in France September 27, 1924.

Films for moving picture machines were at first provided with round perforations in two lateral rows near the edges, outside the line of the pictures. Afterwards in order to increase the resistance of the film to the action of the claws or teeth of cinematographic apparatus, the shape of the perforations was altered, or the number of claws or teeth, acting on each line, was increased.

The present invention relates to a method of perforation which increases the resistance of the film to the action of the claws, the said process consisting essentially in making the perforations, not in two rows but in several rows, and providing the cinematographic apparatus with the same number of claws or teeth arranged in the same row.

Fig. 1 represents by way of example, a film in fragmentary view made according to the present invention and provided with four perforations.

Figure 11:
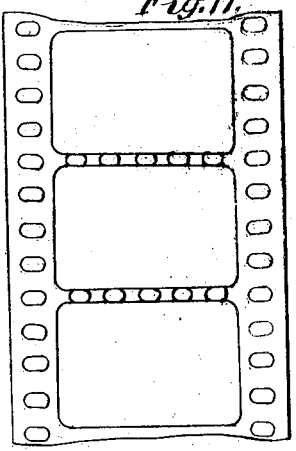
Figure 12:
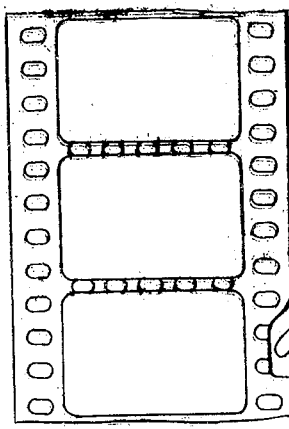

Fig. 2 is a similar view as Fig. 1 drawn to a much larger scale, showing a film having a far greater number of perforations. Figs. 3, 4 and 5 are similar views as Fig. 1 showing various arrangements of the perforation. Figs. 6, 7, 8, 9 and 10 are again similar views as Fig. 1, but on a larger scale, showing a group-wise arrangement of perforations. Figs. 11 and 12 finally show an arrangement, where the outside perforations are larger than the intermediate perforations.

The resistance of a perforation to the action of claws or teeth bearing on the whole of the rectilinear part of this perforation depends upon its width. It will be understood that there is a width of perforation and a number of rows of perforation such that, on the one hand, the resistance to tearing of the line of perforation engaged with the claws or teeth is the same as the resistance to traction of the spaces separating these perforations from each other and the edges of the film; and that, on the other hand, this resistance is maximum. In experimenting with a film of the desired thickness in order to determine the curve representing the values of resistance to tearing of a perforation in proportion to its width, one will find by construction the width of a perforation, and then the number of perforations.

Let $y = f(x)$ be the said curve which represents the values $(y)$ of the resistance to tearing in proportion to the values $(x)$ of the width. Calculation shows that the value of $(x)$ which makes the total resistance of the perforations maximum is that which makes the function $$\frac{f(x)}{x}$$

maximum. It is easy to construct the values of this function. Let us call $(a)$ the value of $(x)$ which makes it maximum and $(p)$ the value of the corresponding resistance $y$.

With (L) as the width of the film $(n)$ the number of lines of perforations $(\lambda)$ the resistance of the film to rupture by traction per width in millimetres, we shall have: $np = \lambda(L - na)$ whence $$n = \frac{L\lambda}{P\lambda d} : (n)$$

is the optimum number of lines of perforations.

The arrangement of such perforations on a number of lines thus calculated constitutes the chief object of the invention, which is the employment of a number of lines of perforations greater than two, whatever the width may be.

By way of example, let us consider a film having a width of 26 millimetres and thus capable, with two lateral margins of 1 millimetre, of containing the standard images having a width of 24 millimetres, having a thickness of 0.15 millimetres and a resistance of 1.200 kilogramme to traction per millimetre. If the width to be given to a perforation has been found as 1 millimetre and its resistance to tearing as 1 kilogramme, this film, should, according to the preceding formula, have 14 lines of perforations to possess the maximum resistance to the action of the claws or teeth. Such a film has the same resistance as a film with two lines of perforations seven times thicker.

A film of maximum resistance is represented by way of example in Fig. 2. The number of perforations is essentially variable, provided that it is more than two.

The invention enables:—

(1) The employment of projectors with claws which are the easiest to construct, the most silent and which give the greatest steadiness.

(2) Prevention of wear of the perforations and preservation of steadiness and fixity.

(3) Possible reduction of the thickness of the films.

(4) Reduction of the width of the film without reduction of the image. These two last items result in an economy which may attain 50% in the price of the support and 20% in the price of the emulsion.

(5) The employment of materials of less strength for the films.

Figs. 3 to 5 show various arrangements of perforations which enable the films to run in the corresponding multiple claw apparatus and also in other existing apparatus which only have one or two claws or teeth for drawing off a width which may be greater than that of the perforations in the films in question; it also prevents mistakes about that side of the film to be placed at the front or back in the apparatus.

These arrangements are characterized either by the perforations being grouped in two or more close lines allowing of a combination of driving with multiple horizontal clips and multiple vertical clips owing to the slight distance which can be given to these lines which allow of greater spaces between the perforations of these lines. They are further characterized by the fact that the perforations of a single line between two images are not of the same width nor at the same intervals so that these films can be run in multiple claw apparatus and also other existing apparatus, or because the perforations are dissymmetrically placed in relation to the middle of the film which avoids mistakes as to which side of the film should be in front or back or finally by combination of the three aforesaid devices or arrangements.

In Figs. 3 and 4 the perforations are in one line in each inter-image space, but they have different widths and are spaced at different intervals.

In Fig. 5 the perforations are not placed symmetrically in relation to the middle of the film.

With this film having rectangular images arranged with their sides perpendicular to the axis of the film, the combination of the perforations in multiple rows placed between the images on a line, and with the rectangular form of these perforations, one obtains a film capable of resisting the intermittent driving stress of the feeding claws or teeth, and the deformation of the perforation is less than with any other arrangement of perforations.

In the special arrangement shown in Figs. 6 to 10 the perforations of each row are arranged in groups of two or more perforations placed close together. The space between these groups is greater than the space between the perforations in each group.

This arrangement is justified by the following consideration:

In a cinematographic apparatus with feeding claws the flat guide in which the film runs should have, in front of the film at the place where the claws penetrate the perforations and then move vertically, one or more openings for the passage of these claws. When the said claws are very close, it is difficult to have one opening for each claw because the spaces between these openings would be too narrow. Consequently, if the claws are very close and at equal intervals, there can only be one opening for all the claws combined. In this case and especially if the film is thin and wide, the film opposite this wide opening, being only maintained by its edges, may shrink and therefore cease to be level. Now it is very important to have a perfectly level film at this place so that the claws can all catch equally in the perforations. The aforesaid arrangement enables several openings to be made in the film guide, of suitable width, with sufficiently wide and well arranged intervals to keep the film level through its entire width, each of these openings allowing a group of two or more claws to pass through.

The numbers of perforations of each group may be the same or different, and consequently the said openings may have the same or different widths.

In the case, for example, where the total number of perforations considered to be the best, taking into account the intervals between the groups, is an even number, these perforations will be distributed in different groups of numbers of perforations. It will also be useful however to have groups of different numbers of perforations to produce dissymmetry which will prevent mistakes regarding the side of the film to be put in front.

Figs. 6 to 10 show several examples of this arrangement. In these figures the outline of the said openings for the claws is given in broken lines.

Figure 6:
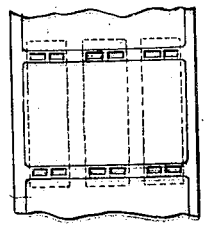

In Fig. 6 each row of perforations consists of three groups of two perforations each.

Figure 7:
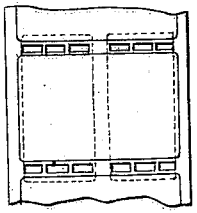

In Fig. 7 each row of perforations consist of two groups of three perforations each.

Figure 8:
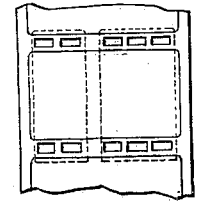

In Fig. 8 each row of perforations consists of two groups, one containing two perforations and the other three.

Figure 9:
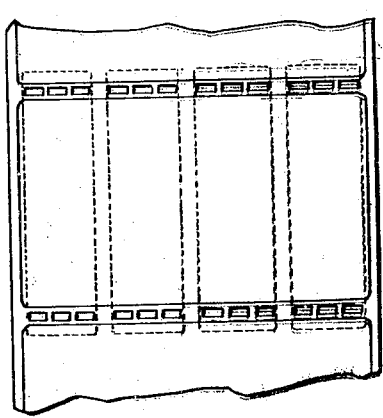

In Fig. 9 is shown a wide film, in which each row of perforations consists of four groups of three perforations each.

Figure 10:
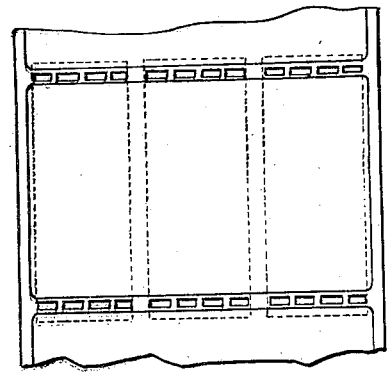

In Fig. 10 each row of perforations consists of three groups of four perforations each.

In all these arrangements, the perforations have their angles rounded the effect of which is to increase the resistance of the film to tearing.

The spaces between the perforations are less wide than the perforations with the object of making the said spaces equally resisting to the driving stress as the perforations to tearing, and this condition also offers the maximum resistance to the action of the claws.

The shape and width of the perforations may vary and they may be placed at different intervals so that these films can be used in apparatus with multiple claws as well as in other apparatus.

The perforations when arranged in multiple rows placed between the images in several close lines allows the film to be operated by a number of horizontal claws combined with a number of vertical claws.

Figs. 11 and 12 show an arrangement where the outer perforations are larger than the intermediary perforations.

The object of this arrangement is to allow the film to run in the multiple claw apparatus made for it and also in other apparatus.

Figs. 11 and 12 show, on the one hand, two lateral lines of perforations identical to those of the ordinary film, viz. placed along the edges, outside of the images and four to each image and, on the other hand, multiple rows of intermediary perforations, viz. more than two in number, which rows are between the images.

These intermediary perforations are of small height so that they will come within the intervals of the images which at most are 1 millimetre.

This latter film is more especially intended to be used in a projecting apparatus which has the ordinary continuous driving sprocket wheels, the teeth of which act on the two customary lines of perforations and, in addition thereto multiple intermittent flat driving claws acting either on the intermediary perforations alone or on these intermediary perforations, and also on the lateral perforations.

In this last case, it is well to place the two last lateral perforations of each image on a level with the line of intermediary perforations, as shown in Fig. 11, so that the comb of claws can be cut in the same sheet of metal. This condition, however, is not essential, if the comb of claws is made otherwise.

The wear of such a film on which fixity or steadiness depends is less than that of an ordinary film because the intermittent driving stress, which is very great compared with that of a continuous drive, is distributed over more than two perforations, and even over more than four in the case where the claws act both on the intermediary perforations and the lateral perforations.

Such a film can, nevertheless, be used like any ordinary film having two lateral lines of perforation in the usual projecting apparatus provided with two claws for intermittent driving, or with an intermittent driving sprocket wheel with two rows of teeth operated by a Maltese cross or otherwise; the intermediary perforations are then inoperative.

Finally, such a film can be used also like any film with multiple perforations in projecting apparatus provided with intermittent driving by means of multiple claws, without continuous reels.

I claim as my invention:

A film for motion picture machines having substantially rectangular perforations provided in the transverse spaces between the images, wherein the ratio of the number ($N$) of transverse perforations to the width ($L$) of the film, having a specific resistance to rupture by traction $\lambda$ is determined by the formula:

$$N = \frac{L\lambda}{p - a\lambda}$$

in which $a$ is the width of the perforations, $p$ the resistance to rupture for the width $a$ in such a way that the resistance to tearing of the line of perforations engaged is the same as the resistance to rupture by traction of the spaces separating them, this resistance being the maximum.

In testimony whereof I have affixed my signature.

JULIEN HENRI JARNIER.